United States Patent

Kolagotla

[11] Patent Number: 5,978,826
[45] Date of Patent: Nov. 2, 1999

[54] ADDER WITH EVEN/ODD 1-BIT ADDER CELLS

[75] Inventor: Ravi Kumar Kolagotla, Breinigsville, Pa.

[73] Assignee: Lucent Techologies Inc., Murray Hill, N.J.

[21] Appl. No.: 08/755,846

[22] Filed: Nov. 26, 1996

Related U.S. Application Data

[60] Provisional application No. 60/007,885, Dec. 1, 1995.
[51] Int. Cl.⁶ ........................................................ G06F 7/50
[52] U.S. Cl. ............................................. 708/707; 708/710
[58] Field of Search ..................................... 364/768, 782, 364/783, 784.01–784.04, 785, 786.01–786.04, 787.01–787.04

[56] References Cited

U.S. PATENT DOCUMENTS

| | | | |
|---|---|---|---|
| 3,590,230 | 6/1971 | Nordquist | 235/176 |
| 3,712,323 | 1/1973 | Healey | 137/81.5 |
| 3,717,755 | 2/1973 | Briley . | |
| 3,789,206 | 1/1974 | Heightley | 235/172 |
| 3,906,211 | 9/1975 | Glaser | 235/175 |
| 3,978,329 | 8/1976 | Baugh et al. | 235/176 |
| 4,931,981 | 6/1990 | Knauer | 364/784.04 |
| 5,027,312 | 6/1991 | Knauer et al. | 364/788 |
| 5,138,570 | 8/1992 | Argade | 364/760 |
| 5,239,499 | 12/1990 | Shiaishi et al. | 364/786 |
| 5,251,164 | 10/1993 | Dodson et al. | 364/715.01 |
| 5,257,218 | 10/1993 | Poon | 364/787 |
| 5,272,656 | 12/1993 | Genereux | 364/724 |
| 5,276,635 | 1/1994 | Naini et al. | 364/787 |
| 5,278,783 | 1/1994 | Edmondson | 364/787 |
| 5,289,397 | 2/1994 | Clark et al. | 364/746 |
| 5,299,319 | 3/1994 | Vassiliadis et al. | 395/375 |
| 5,337,269 | 8/1994 | McMahan et al. | 364/787 |
| 5,359,569 | 10/1994 | Fujita et al. | 365/229 |
| 5,384,724 | 1/1995 | Jagini | 364/787 |
| 5,390,137 | 2/1995 | Shim | 364/787 |
| 5,600,583 | 2/1997 | Bosshart et al. | 364/736.5 |

*Primary Examiner*—Emmanuel L. Moise
*Attorney, Agent, or Firm*—David L. Smith

[57] ABSTRACT

An integrated circuit including an adder that is a series of one-bit cascaded adder cells. The circuits that implement the adder cells are not all alike. The adder cells are of two types: an even adder cell and an odd adder cell. The even adder cells receive all inputs as noninverted inputs, provide as outputs a noninverted sum bit output and the inverse of the carry-out bit. The odd adder cells receive as inputs the inverse of the carry-in bit, all other inputs are noninverted, and provides as outputs a noninverted sum bit and a noninverted carry-out bit.

37 Claims, 4 Drawing Sheets

ADDER WITH EVEN/ODD 1-BIT ADDER CELLS

This application claims the benefit of provisional application no. 60/007,885 filed Dec. 1, 1995.

TECHNICAL FIELD

This invention relates generally to fast adders and in particular to carry-ripple adders in which adjacent adder cells are not identical and operate on inverted carry inputs.

BACKGROUND OF THE INVENTION

Microprocessors such as digital signal processors perform addition of two binary numbers, each of which can have several bits. Microprocessors available today operate on binary numbers with 4 to 64 bits. The trend has been to increase the number of bits in the binary numbers. Therefore it is expected microprocessors in the future will operate on binary numbers having even more bits.

In performing the addition of two numbers, one of the numbers, known as the augend, is stored in a first register. The other number, known as the addend, is stored in a second register. The addition process begins by adding the least significant bits of the augend and addend in a first cell of a multicell adder. A sum bit and carry bit are generated. The carry bit is added to the sum of the augend bit and the addend bit in the next cell. This process continues through as many cells as are necessary to complete the addition.

In each cell, the addition of three bits occurs: an augend bit, an addend bit, and a carry bit from the previous (if present) cell. The carry bit from the previous cell is sometimes referred to as a carry-in bit. The result of the addition of these three bits produces two bits as outputs. The two bits are a sum bit and a carry bit, sometimes referred to as a carry-out bit to distinguish it from the carry-in bit. The carry-out bit is provided to the next cell as the carry-in bit or, through some carry look-ahead or carry skip-ahead technique, is propagated to a cell location of a more significant bit. A carry-out bit from the cell having as two of its inputs the most significant bits of the registers storing the augend and addend may indicate a carry overflow condition. Since the addition process is the same in each cell, it has been the practice of microprocessor manufacturers to develop a logic circuit to perform the binary addition for one cell, and then to replicate the circuit for each cell position. The resultant multicell adder is thus a cascaded series of identical one-bit adders. These multicell adders may be used within each group of a carry-skip adder or other types of fast adders.

A well-known technique of cascading a series of one-bit adders to form a fast n-bit carry-ripple adder is to omit the final inverter used in generating the sum and carry outputs. Every other one-bit adder, or cell, is designed to operate on inverted inputs. A drawback of this technique is the necessity for additional inverters to invert the inputs of every other cell, as well as the sum output bit of the alternate cells.

Using identical circuits for each cell position necessitates inverting some of the inputs to a cell prior to performing addition, or inverting some of the outputs from a cell subsequent to performing the addition but before passing the outputs on, such as to the next cell in the cascaded series or as an output bit from the adder. Introduction of inverters increases the power consumed in performing an addition operation, and increases the time necessary for a cell to complete its addition operation. The increased time consumed is aggregated when the microprocessor performs operations that are addition intensive such as matrix multiplication, convolution or correlation.

It would be desirable to have a fast n-bit adder in which there is no need to invert any of the inputs to adder cells and the adder would generate the true sum output for each cell.

SUMMARY OF THE INVENTION

In accordance with an illustrative embodiment of the invention, an integrated circuit includes an adder that is a series of one-bit cascaded adder cells. The circuits that implement the adder cells are not all alike. The adder cells are of two types: an even adder cell and an odd adder cell. The even adder cells receive all inputs as noninverted inputs, provide as outputs a noninverted sum bit output and the inverse of the carry-out bit. The odd adder cells receive as inputs the inverse of the carry-in bit, all other inputs are noninverted, and provides as outputs a noninverted sum bit and a noninverted carry-out bit.

DETAILED DESCRIPTION

Figure 1:
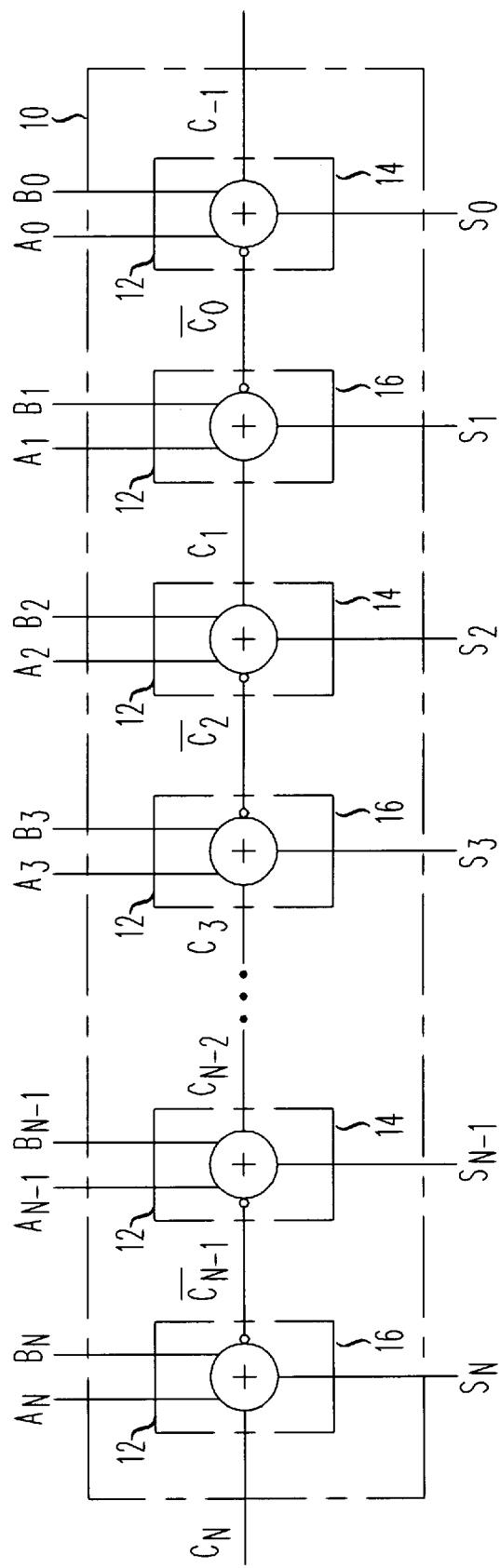
FIG. 1 is a schematic diagram of a n-bit adder, in accordance with an illustrative embodiment of the invention.

FIG. 1 is a schematic diagram of an n-bit adder 10 in accordance with an illustrative embodiment of the present invention. N can take on any value greater than 1, and may be either odd or even in magnitude. Adder 10 may be used as a component in any fast adder such as, but not limited to, a carry-skip adder, a carry-look-ahead adder, or a carry-select adder. In the illustrative embodiment, adder 10 is constructed of a plurality of cascaded cells 12 to perform a ripple-carry add. As a matter of convenience, the cells will be referred to as either even or odd cells, such as even cells 14 or odd cells 16.

In the addition process, bits of a binary representation of two numbers are added together. The augend, A, is stored in a first register (not shown). The addend, B, is stored in a second register (also not shown). Each cell 12 of adder 10 has three inputs: an augend bit $A_k$, an addend bit $B_k$ and a carry-in bit, $C_{k-1}$. Each cell 12 of adder 10 provides two outputs, a sum bit $S_k$ and a carry-out bit $C_k$. It is understood that the carry-out bit of one cell is the carry-in bit for the next cell in the cascade sequence, though some look-ahead or carry skip-ahead technique may be used to propagate a carry bit to a cell performing the addition of more significant bits.

The addition process begins by adding the least significant bit (LSB) of the augend, $A_0$ with the LSB of the addend, $B_0$, and the carry-in bit $C_{-1}$ in an adder cell 12. The adder cell 12 in which the LSBs are added is selected to be an even cell 14 if a non-inverted version of the carry-in $C_{-1}$ is available. If an inverted version of the carry-in is available, the adder cell 12 in which the LSBs are added is selected to be an odd cell 16.

The even cells 14 receive a non-inverted version of the carry-in bit $C_{k-1}$ and produce an inverted version of the carry-out bit, $\overline{C_k}$. The odd cells 16 receive an inverted version of the carry-in bit, $\overline{C_{k-1}}$, and produce a non-inverted version of the carry-out bit, $C_k$.

The addition process continues through as many cells 12 as are necessary to complete the addition of the augend and addend. The outputs from adder 10 are the sum bits $S_N$, $S_{N-1}$, ... $S_3$, $S_2$, $S_1$, $S_0$, and the carry-out bit $C_N$ of the cell 12 that adds the most significant bits of the augend and addend, as is known in the art. The carry-out bit $C_N$ being a logic high, indicates an overflow condition has occurred.

Figure 2:
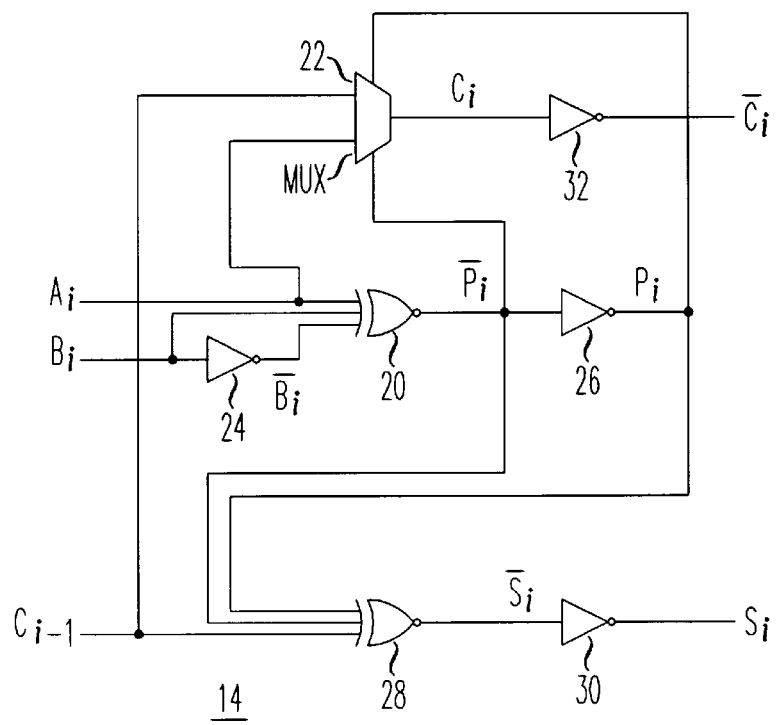
FIG. 2 is a logic diagram of an even cell in the adder of FIG. 1.

FIG. 2 is a logic diagram of an even cell 14. Even cell 14 in FIG. 2 employs the subscript i for inputs, outputs, and internally generated and utilized signals. The augend bit $A_i$ provides one input to a multiple input exclusive NOR (ENOR) gate 20. The augend bit $A_i$ is also provided as an input to multiple input multiplexer 22. The addend bit $B_i$ is provided as another input to ENOR gate 20. The addend bit is inverted in inverter 24 to produce the inverse of addend bit, $\overline{B_i}$, which is provided as another input to ENOR gate 20. The output of ENOR gate 20 is signal $\overline{P_i}$, a signal used internally to even cell 14. $\overline{P_i}$ provides one control input to multiplexer 22 and is inverted in inverter 26, producing $P_i$, which provides another control input to multiplexer 22. Signals $P_i$ and $\overline{P_i}$ provide two inputs to multiple input ENOR gate 28. The carry-in bit $C_{i-1}$ provides an input to ENOR gate 28 and also to multiplexer 22. The output of ENOR gate 28 is $\overline{S_i}$, the inverse of the sum bit $S_i$. $\overline{S_i}$ is inverted in inverter 30 to generate the sum bit $S_i$.

The control inputs to multiplexer 22, $P_i$ and $\overline{P_i}$, function to cause multiplexer 22 to select one of its inputs as its output $C_i$, the carry-out bit. Inverter 22 inverts $C_i$ to produce $\overline{C_i}$, the inverse of the carry-out bit, which is another output of even cell 14.

Each of the outputs of cell 14, $\overline{C_i}$ and $S_i$, are outputs of inverters which provide drive capability as input to the next cell or stage. The carry-out bit of even cell 14 is in the proper state of inversion or non-inversion to be input directly to an odd cell 16 such as the next cascaded cell 12 in adder 10.

Figure 3:
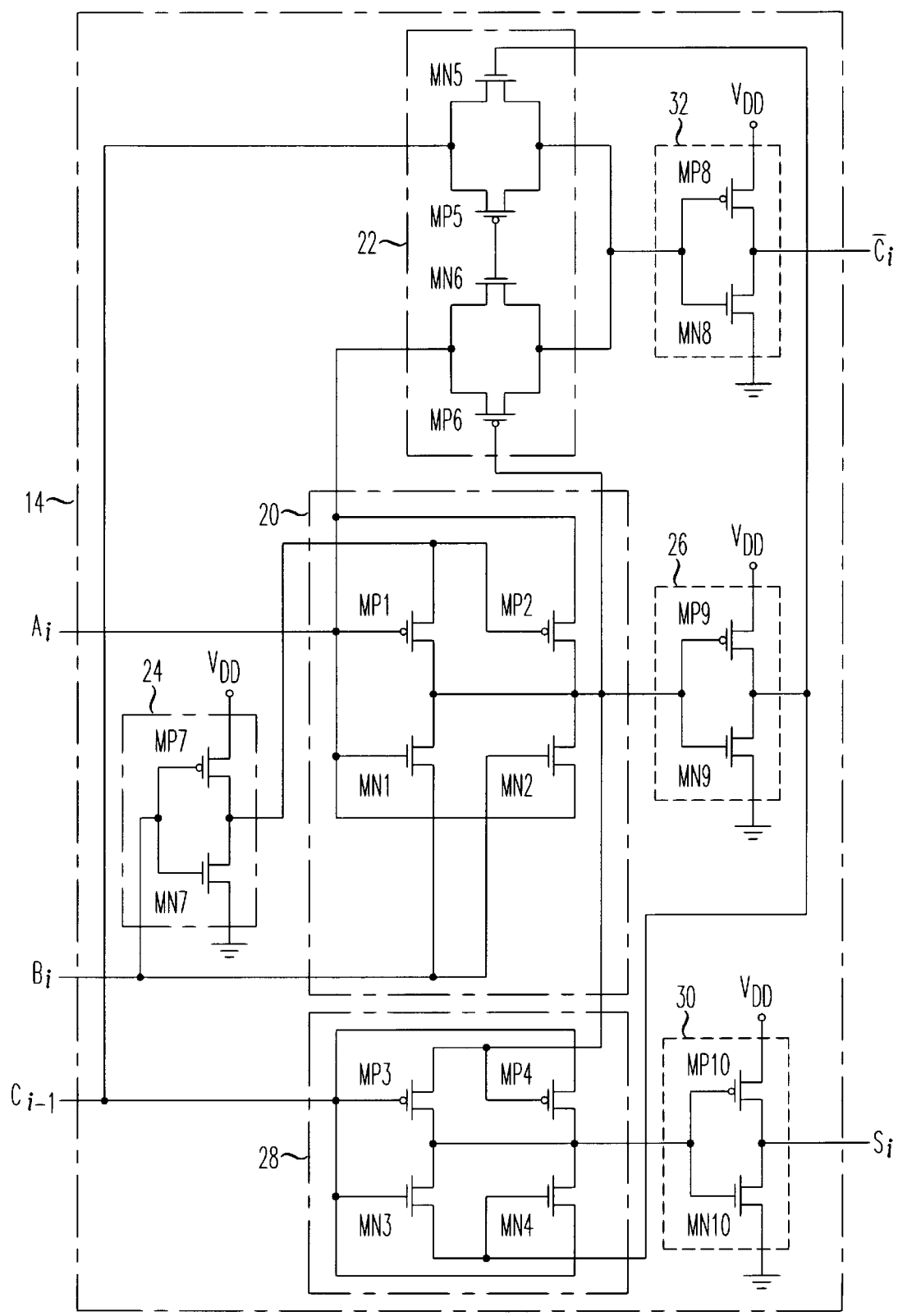
FIG. 3 is a transistor-level circuit diagram of the even cell of FIG. 2.

FIG. 3 shows a transistor-level schematic diagram of the even cell 14 shown in FIG. 2. ENOR gates 20 and 28, inverters 24, 26, 30 and 32, as well as multiplexer 22 are identified. Even cell 14 is comprised of twenty transistors, four in each ENOR gate, two in each inverter, and four in multiplexer 22.

Figure 4:
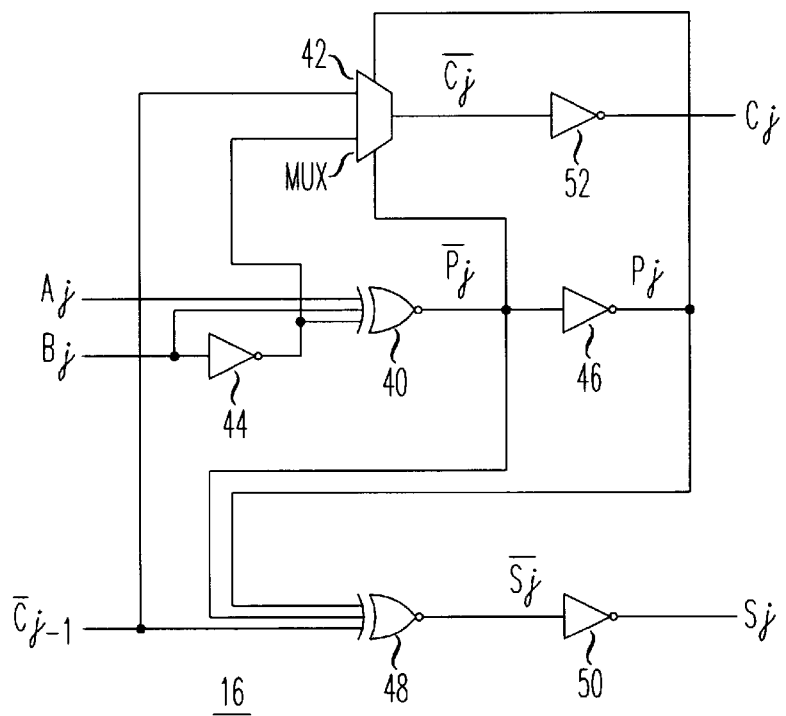
FIG. 4 is a logic diagram of an odd cell in the adder of FIG. 1.

FIG. 4 is a logic diagram of an odd cell 16. Odd cell 16 in FIG. 4 employs the subscript j for inputs, outputs, and internally generated and utilized signals. The augend bit $A_j$ provides one input to a multiple input ENOR gate 40. The addend bit $B_j$ is provided as another input to ENOR gate 40. The addend bit is inverted in inverter 44 to produce the inverse of the addend bit, $\overline{B_j}$, which is provided as another input to ENOR gate 40. $\overline{B_j}$ is also provided as an input to multiple input multiplexer 42. The output of ENOR gate 40 is signal $\overline{P_j}$, a signal used internally to odd cell 16. Signal $\overline{P_j}$ provides one control input to multiplexer 42 and is inverted in inverter 46, producing $P_j$, which provides another control input to multiplexer 42. Signals $P_j$ and $\overline{P_j}$ provide two inputs to multiple input ENOR gate 48. The carry-in bit $\overline{C_{j-1}}$ provides an input to ENOR gate 48 and also to multiplexer 42. The output of ENOR gate 28 is $\overline{S_j}$, the inverse of the sum bit $S_j$. $\overline{S_j}$ is inverted in inverter 50 to generate the sum bit $S_j$ which is an output of both odd cell 16 and adder 10.

The control inputs to multiplexer 42, $P_j$ and $\overline{P_j}$, function to cause multiplexer 42 to select one of the signals ($A_j$ or $C_{j-1}$) presented at its input as its output $\overline{C_j}$, the inverse of the carry-out bit. Inverter 52 inverts $\overline{C_j}$ to produce $C_j$, the noninverted carry-out bit, which is another output of odd-cell 16.

Each of the outputs of odd cell 16, $C_j$ and $S_j$ are outputs of inverters, inverters 52 and 50 respectively. Being outputs of inverters, outputs $C_j$ and $S_j$ are able to provide drive as inputs to the next stage or cell as appropriate. The carry-out bit of even cell 16 is in the proper state of inversion or non-inversion to be input directly to an even cell such as the next cascaded cell 12 in adder 10.

Figure 5:
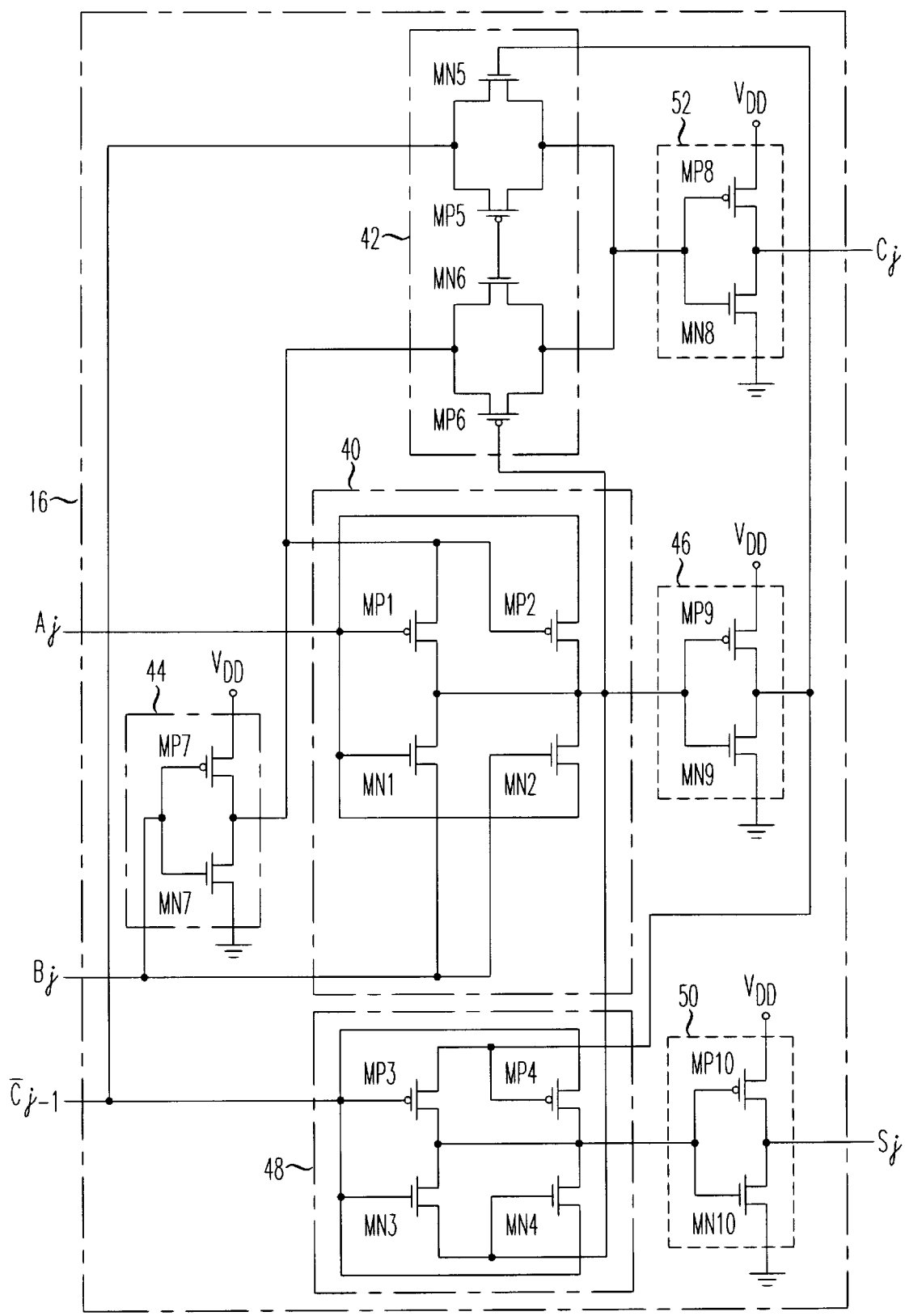
FIG. 5 is a transistor-level circuit diagram of the odd cell of FIG. 4.

FIG. 5 shows a transistor-level schematic diagram of the odd cell 16 shown in FIG. 3. ENOR gates 40 and 48, inverters 44, 46, 50 and 52, as well as multiplexer 42 are identified. Odd cell 16 is comprised of twenty transistors, the same number of transistors as even cell 14. Four of the transistors are in each ENOR gate, two transistors are in each inverter, and four transistors are in multiplexer 42.

In operation, each cell 12 of adder 10 performs a one-bit ripple-carry add. The carry-output from the cell computing the sum of the LSB is provided as an input to the next of the cascaded cells. Only the carry needs to be inverted. The true of the augend and addend bits are inputs to and are used in all cells, without the need to invert the inputs to the cells. The true of the sum bits is provided as an output of all cells. Both the sum bit and carry output bit are provided by inverters to drive the next stage or cell. At the transistor level, both the even and odd cells have the same number of transistors.

An adder design in accordance with the present invention has the advantage that it eliminates the need to invert the inputs of every other cell. True inputs are used in both the odd and even cells. In addition, the true sum output is generated for both the even and odd cells, thereby eliminating the need to invert the sum output of even cells.

While the illustrative embodiment has been shown as employing complementary metal oxide semiconductors, the invention is not limited thereto. While the illustrative embodiment of the invention has been described as having an adder that is comprised of even and odd cells in which the carry-out bit of an even cell is inverted and the carry-in bit to an odd cell is inverted, one skilled in the art could design a circuit to achieve the same function in which the logic states differ from those in the illustrative embodiment.

The invention is particularly useful in communication systems and equipment employing integrated circuits including this technique. Such communications systems and equipment has the advantage providing high speed digital additions and subtractions where reductions in time and power in the performance of addition operations is important.

While the illustrative embodiment of the invention has not been described as incorporating pipelining, one skilled in the art would recognize the enhanced computational efficiency available by utilizing pipelining in the design. Pipelining is achieved by initiating computation with a new data set before completing computations with a previous set of data. The more latches used in pipelining, the greater the depth of pipelining. Pipelining causes an initial latency in computation time required to fill the pipeline, but maximizes usage of resources such as adders.

The invention claimed is:

1. An integrated circuit comprising:
   an adder having at least two cells, said at least two cells including a first cell, said first cell adapted to receive as inputs an augend bit, an addend bit, and a carry-in bit, said first cell adapted to provide as outputs a carry-out bit and a sum bit representative of the sum of the input bits, the first cell comprising:
   a first inverter adapted to receive the addend bit as an input and provide an inverse of the addend bit as an output;

a first exclusive NOR gate adapted to receive as inputs the augend input bit, the addend bit, and the inverse of the addend bit, the first exclusive NOR gate providing an output that is the exclusive NOR combination of its inputs;

a second inverter adapted to receive the output of the first exclusive NOR gate as an input and provide as an output the inverse of the first exclusive NOR gate output;

a second exclusive NOR gate adapted to receive as inputs the output of the first exclusive NOR gate, the output of the second inverter, and the carry-in bit, the second exclusive NOR gate providing an output that is the exclusive NOR combination of its inputs;

a third inverter adapted to receive the output of the second exclusive NOR gate as an input and provide as an output the inverse of the second exclusive NOR gate output; and a first multiplexer adapted to receive as inputs the inverse of the addend bit as output from the first inverter and the carry-in bit, the first multiplexer receiving as a control input at least one of the output of the first exclusive NOR gate and the output of the second inverter, the first multiplexer adapted to select one of its inputs as an output depending on the control input.

2. An integrated circuit as recited in claim 1, further comprising:

a fourth inverter adapted to receive as an input the output of the first multiplexer and provide the inverse thereof as its output.

3. An integrated circuit as recited in claim 1, wherein the adder comprises a carry-skip adder.

4. An integrated circuit as recited in claim 1, wherein the adder comprises a carry look-ahead adder.

5. An integrated circuit as recited in claim 1, wherein the adder comprises a carry-select adder.

6. An integrated circuit as recited in claim 1, wherein the adder comprises an odd number of cells.

7. An integrated circuit as recited in claim 1, wherein the adder comprises an even number of cells.

8. An integrated circuit comprising:

an adder having at least two cells, said at least two cells including a first cell, said first cell adapted to receive as inputs an augend bit, an addend bit, and a carry-in bit, said first cell adapted to provide as outputs a carry-out bit and a sum bit representative of the sum of the inputs, the first cell comprising:

a first inverter adapted to receive the addend bit as an input and provide an inverse of the addend bit as an output;

a first exclusive NOR gate adapted to receive as inputs the augend input bit, the addend bit, and the inverse of the addend bit, the first exclusive NOR gate providing an output that is the exclusive NOR combination of its inputs;

a second inverter adapted to receive the output of the first exclusive NOR gate as an input and provide as an output the inverse of the first exclusive NOR gate output;

a second exclusive NOR gate adapted to receive as inputs the output of the first exclusive NOR gate, the output of the second inverter, and the carry-in bit, the second exclusive NOR gate providing an output that is the exclusive NOR combination of its inputs;

a third inverter adapted to receive as an input the output of the second exclusive NOR gate and provide as an output the inverse of the second exclusive NOR gate output; and a first multiplexer adapted to receive as inputs the augend bit and the carry-in bit, the first multiplexer receiving as a control input at least one of the output of the first exclusive NOR gate and the output of the second inverter, the first multiplexer adapted to select one of its inputs as an output depending on the control input.

9. An integrated circuit as recited in claim 8, further comprising:

a fourth inverter adapted to receive as an input the output of the first multiplexer and provide the inverse thereof as its output.

10. An integrated circuit as recited in claim 8, wherein the adder comprises a carry-skip adder.

11. An integrated circuit as recited in claim 8, wherein the adder comprises a carry look-ahead adder.

12. An integrated circuit as recited in claim 8, wherein the adder comprises a carry-select adder.

13. An integrated circuit as recited in claim 8, wherein the adder comprises an odd number of cells.

14. An integrated circuit as recited in claim 8, wherein the adder comprises an even number of cells.

15. An integrated circuit comprising:

an adder having at least two cells, said at least two cells including a first cell, said first cell adapted to receive as inputs an augend bit, an addend bit, and a carry-in bit, said first cell adapted to provide as outputs a carry-out bit and a sum bit representative of the sum of the input bits, the first cell comprising:

a first inverter adapted to receive the addend bit as an input and provide an inverse of the addend bit as an output;

a first exclusive NOR gate adapted to receive as inputs the augend input bit, the addend bit, and the inverse of the addend bit, the first exclusive NOR gate providing an output that is the exclusive NOR combination of its inputs;

a second inverter adapted to receive the output of the first exclusive NOR gate as an input and provide as an output the inverse of the first exclusive NOR gate output;

a second exclusive NOR gate adapted to receive as inputs the output of the first exclusive NOR gate, the output of the second inverter, and the carry-in bit, the second exclusive NOR gate providing an output that is the exclusive NOR combination of its inputs; and a first multiplexer adapted to receive as inputs the inverse of the addend bit as output from the first inverter and the carry-in bit, the first multiplexer receiving as a control input at least one of the output of the first exclusive NOR gate and the output of the second inverter, the first multiplexer adapted to select one of its inputs as an output depending on the control input.

16. An integrated circuit as recited in claim 15, wherein the adder comprises a carry-skip adder.

17. An integrated circuit as recited in claim 15, wherein the adder comprises a carry look-ahead adder.

18. An integrated circuit as recited in claim 15, wherein the adder comprises a carry-select adder.

19. An integrated circuit as recited in claim 15, wherein the adder comprises an odd number of cells.

20. An integrated circuit as recited in claim 15, wherein the adder comprises an even number of cells.

21. An integrated circuit comprising:

an adder having at least two cells, said at least two cells including a first cell, said first cell adapted to receive as inputs an augend bit, an addend bit, and a carry-in bit, said first cell adapted to provide as outputs a carry-out bit and a sum bit representative of the sum of the inputs, the first cell comprising:

a first inverter adapted to receive the addend bit as an input and provide an inverse of the addend bit as an output;

a first exclusive NOR gate adapted to receive as inputs the augend input bit, the addend bit, and the inverse of the addend bit, the first exclusive NOR gate providing an output that is the exclusive NOR combination of its inputs;

a second inverter adapted to receive the output of the first exclusive NOR gate as an input and provide as an output the inverse of the first exclusive NOR gate output;

a second exclusive NOR gate adapted to receive as inputs the output of the first exclusive NOR gate, the output of the second inverter, and the carry-in bit, the second exclusive NOR gate providing an output that is the exclusive NOR combination of its inputs; and a first multiplexer adapted to receive as inputs the augend bit and the carry-in bit, the first multiplexer receiving as a control input at least one of the output of the first exclusive NOR gate and the output of the second inverter, the first multiplexer adapted to select one of its inputs as an output depending on the control input.

22. An integrated circuit as recited in claim 21, wherein the adder comprises a carry-skip adder.

23. An integrated circuit as recited in claim 21, wherein the adder comprises a carry look-ahead adder.

24. An integrated circuit as recited in claim 21, wherein the adder comprises a carry-select adder.

25. An integrated circuit as recited in claim 21, wherein the adder comprises an odd number of cells.

26. An integrated circuit as recited in claim 21, wherein the adder comprises an even number of cells.

27. An integrated circuit comprising:

an adder having at least two cells, said at least two cells comprising a first cell and a second cell, each of said first and second cells adapted to receive as respective inputs an augend bit, an addend bit, and a carry-in bit, each of said first and second cells adapted to provide as respective outputs a carry-out bit and a sum bit representative of the sum of the respective inputs, the adder comprising:

the first cell comprising:

a first inverter adapted to receive a respective addend bit as an input and provide an inverse of the addend bit as an output;

a first exclusive NOR gate adapted to receive as inputs the respective augend bit, addend bit, and the inverse of the addend bit, the first exclusive NOR gate providing an output that is the exclusive NOR combination of its inputs;

a second inverter adapted to receive the output of the first exclusive NOR gate as an input and provide as an output the inverse of the first exclusive NOR gate output;

a second exclusive NOR gate adapted to receive as inputs the output of the first exclusive NOR gate the output of the second inverter, and the respective carry-in bit, the second exclusive NOR gate providing an output that is the exclusive NOR combination of its inputs;

a third inverter adapted to receive the output of the second exclusive NOR gate as an input and provide as an output the inverse of the second exclusive NOR gate output; and a first multiplexer adapted to receive as inputs the inverse of the addend input bit as output from the first inverter and the carry-in bit, the first multiplexer receiving as a control input at least one of the output of the first exclusive NOR gate and the output of the second inverter, the first multiplexer adapted to select one of its inputs as an output depending on the control input;

the second cell comprising:

a fourth inverter adapted to receive the respective addend bit as an input and provide an inverse of the respective addend bit as an output;

a third exclusive NOR gate adapted to receive as inputs the respective augend bit, the respective addend bit, and the inverse of the respective addend bit, the third exclusive NOR gate providing an output that is the exclusive NOR combination of its inputs;

a fifth inverter adapted to receive the output of the third exclusive NOR gate as an input and provide as an output the inverse of the third exclusive NOR gate output;

a fourth exclusive NOR gate adapted to receive as inputs the output of the third exclusive NOR gate, the output of the fifth inverter, and the respective carry-in bit, the fourth exclusive NOR gate providing an output that is the exclusive NOR combination of its inputs;

a sixth inverter adapted to receive as an input the output of the third exclusive NOR gate and provide as an output the inverse of the fourth exclusive NOR gate output; and a second multiplexer adapted to receive as inputs the respective augend bit and the respective carry-in bit, the second multiplexer receiving as a control input at least one of the output of the third exclusive NOR gate and the output of the fifth inverter, the second multiplexer adapted to select one of its inputs as an output depending on the control input.

28. An integrated circuit as recited in claim 27, wherein the adder comprises a carry-skip adder.

29. An integrated circuit as recited in claim 27, wherein the adder comprises a carry look-ahead adder.

30. An integrated circuit as recited in claim 27, wherein the adder comprises a carry-select adder.

31. An integrated circuit as recited in claim 27, wherein the adder comprises an odd number of cells.

32. An integrated circuit as recited in claim 27, wherein the adder comprises an even number of cells.

33. An integrated circuit as recited in claim 27, further comprising:

a seventh inverter adapted to receive as an input the output of the first multiplexer and provide the inverse therof as its output.

34. An integrated circuit as recited in claim 33, wherein the seventh inverter output provides the carry-in bit to the second cell.

35. An integrated circuit as recited in claim 33, further comprising:

an eighth inverter adapted to receive as an input the output of the second multiplexer and provide the inverse thereof as its output.

36. An integrated circuit as recited in claim 35, wherein the eighth inverter output provides the non-inverted carry-in bit to the first cell.

37. An integrated circuit as recited in claim 27, further comprising:

a ninth inverter adapted to receive as an input the output of the second multiplexer and provide the inverse thereof as its output.

* * * * *